US00RE44678E

(19) United States
(12) Reissued Patent
Oostveen et al.

(10) Patent Number: US RE44,678 E
(45) Date of Reissued Patent: Dec. 31, 2013

(54) RECORD CARRIER, PLAYBACK APPARATUS AND INFORMATION SYSTEM COMPRISING A RECORD CARRIER AND A PLAYBACK APPARATUS

(75) Inventors: Job Cornelis Oostveen, Haren (NL); Willem Marie Julia Marcel Coene, Asten (NL); Jan Harm Boer, Nuenen (NL); Franciscus Lucas Antonius Johannes Kamperman, Geldrop (NL); Aloysius Michael Josephus Maria Spruijt, Asten (NL); Paulus Reinier Joannes Van Roosmalen, Eindhoven (NL)

(73) Assignee: Koninklijke Philips N.V., Eindhoven (NL)

(21) Appl. No.: 12/138,565

(22) Filed: Jun. 13, 2008

Related U.S. Patent Documents

Reissue of:
(64) Patent No.: 7,068,574
Issued: Jun. 27, 2006
Appl. No.: 09/897,331
Filed: Jul. 2, 2001

(30) Foreign Application Priority Data

Jul. 7, 2000 (EP) ..... 00114641

(51) Int. Cl.
*G11B 7/00* (2006.01)

(52) U.S. Cl.
USPC ..... 369/47.19; 369/47.22; 369/275.3; 369/53.21

(58) Field of Classification Search
None
See application file for complete search history.

(56) References Cited

U.S. PATENT DOCUMENTS

| | | | |
|---|---|---|---|
| 5,737,286 | A | 4/1998 | Timmermans et al. |
| 5,802,174 | A | 9/1998 | Sako et al. |
| 5,930,210 | A | 7/1999 | Timmermans et al. |
| 5,999,504 | A | 12/1999 | Aoki |
| 6,069,870 | A | 5/2000 | Maeda et al. |
| 6,295,270 | B1 | 9/2001 | Van Den Enden et al. |
| 6,331,969 | B1 | 12/2001 | Kobayashi et al. |
| 6,345,018 | B1 | 2/2002 | Maegawa et al. |
| 6,411,585 | B1 | 6/2002 | Kobayashi |
| 6,549,495 | B1 | 4/2003 | Spruit et al. |
| 2001/0008508 | A1 | 7/2001 | Watanabe |

FOREIGN PATENT DOCUMENTS

| | | | |
|---|---|---|---|
| DE | 19900653 | A1 | 7/1999 |
| EP | 0838808 | A2 | 4/1998 |
| JP | 1258075 | A | 10/1989 |
| JP | 9017119 | A | 1/1997 |
| JP | 10320773 | A | 12/1998 |
| JP | 11185258 | A | 7/1999 |
| JP | 2000195049 | A | 7/2000 |
| JP | 2001110061 | A | 4/2001 |
| WO | 9833176 | A2 | 7/1998 |
| WO | 9948091 | A3 | 9/1999 |

*Primary Examiner* — Joseph Haley

(57) ABSTRACT

An information system according to the invention comprises a record carrier and a playback apparatus. The record carrier has information marks along a track thereof and exhibits first variations caused by existence and nonexistence of the information marks along the track. The first variations represent an information signal recorded on said record carrier. The record carrier further exhibits second variations caused by variations associated with the information marks. The phase of the second variations is coupled to the phase of the first variations.

41 Claims, 4 Drawing Sheets

Figure 1A:
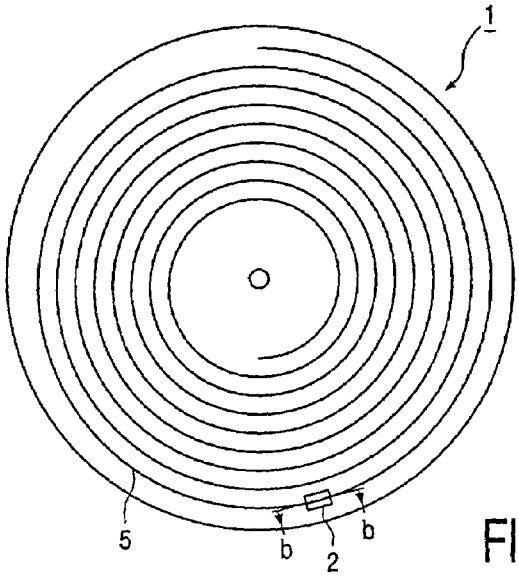

RECORD CARRIER, PLAYBACK APPARATUS AND INFORMATION SYSTEM COMPRISING A RECORD CARRIER AND A PLAYBACK APPARATUS

Matter enclosed in heavy brackets [ ] appears in the original patent but forms no part of this reissue specification; matter printed in italics indicates the additions made by reissue.

In U.S. Pat. No. 5,930,210 a record carrier, a playback apparatus and information system comprising a record carrier and a playback apparatus is described. The record carrier described therein comprises first variations caused by existence and nonexistence of information marks along the track. Said first variations represent an information signal recorded on said record carrier. The information marks are for example in the form of pits. The record carrier further comprises second variations caused by variations associated with the information marks. The document referred to above describes an embodiment, wherein the second variations are in the form of variations in the radial position. The information marks are arranged along a wobbled track, the wobble having a frequency which is beyond the nominal range of a tracking servo system. This allows the second variations to be detected from the radial error signal. The second variations represent a decryption key which is necessary for decoding the content of the information in the information marks. Due to the fact that a bit copying machine usually only copies the variations of the first physical parameter (which variations represent the information recorded) the variations in the second physical parameter are not copied. Consequently the special discs cannot be copied by the usual type of bit copying machines.

Such a combination of first and second variations is also proposed for a record carrier according to the CD2 standard. It is necessary that such a record carrier can be reproduced on a player which employs 3-beam radial tracking as well as one which uses the radial push-pull method. However in a player comprising a three beam radial tracking system, the two satellite detectors have a relatively large tangential distance. As the radial wobble has a relatively high frequency, e.g. 22.05 kHz in the case of a 1× playback speed, this results in a relatively large phase shift between the signals of the two satellite detectors, which hinders a reliable detection of the wobble signal. Alternatively if the wobble signal is derived from only one of the signals of the sattelite detector, it has a relatively large signal to noise ratio, which also hinders a reliable detection of the wobble signal.

It is a purpose of the present invention to provide a record carrier which enables a playback apparatus to more reliably detect the second variations. It is a further purpose of the invention to provide a playback apparatus which more reliably detects the second variations. It is a further purpose of the invention to provide an information system comprising a record carrier and a playback apparatus in which the second variations are reliably detected.

According to the invention the record carrier has information marks along a track thereof and exhibits first variations caused by existence and nonexistence of the information marks along the track, said first variations representing an information signal recorded on said record carrier, and second variations caused by variations associated with the information marks; the phase of the second variations being coupled to the phase of the first variations.

The record carrier according to the invention is in particularly suitable for playback on a playback apparatus according to the invention including:

a transducer unit for scanning said record carrier, said transducer unit being adapted to detect said first variations and said second variations, a first recovery unit coupled to the transducer unit for recovering a clock signal from the first variations, a second recovery unit coupled to the transducer unit for recovering an information signal from the first variations, a detection unit for detecting whether said second variations exhibit a predetermined variation pattern on the basis of at least one signal, which is at least indicative of said second variations, originating from said transducer unit, the detection unit using the said clock signal for detecting and an enabling unit for enabling said second recovery unit to recover the information signal when said detection unit detects said predetermined variation pattern.

As the phase of the second variations is coupled to the phase of the first variations, the clock signal obtained by the first recovery unit can be reliably used by the detection unit for detecting the second variations. Using a more reliable clock signal also results in a more reliable detection by the detection unit.

It is noted that EP 485 234 describes an information recording device for recording information at a record carrier which comprises tracks which are radially wobbled. The radial wobble represents an address. During recording of data, a recording clock is recovered from the radial wobble. In this information system the information stored in the wobble has no further meaning after the information has been retrieved from the record carrier.

It is further noted that DE 199 00 653 discloses a device for making a master disc in which a wobbled track as well as pre-pits are applied. In order to prevent the occurence of overlapping pre-pits the control signals for applying the wobble and for applying the pre-pits are mutually synchronized to each other. In this case the wobble contains information to control the rotation speed of the record carrier.

It is further noted that U.S. Pat. No. 5,930,210 shows an embodiment in FIG. 5, wherein the detection unit receives the clock signal which is recovered by the PLL from the first variations. In this case the clock signal itself serves as the signal representing the second variations. No independent clock signal is used which could improve the reliability of detecting the signal representing the second variations if the latter is unreliable by noise.

An embodiment of the information system is characterized in that the second variations exhibit a modulation pattern representing a code, that the detection means comprises code recovery means for recovering the said code from the detection signal and means for activating the enabling means in response to the recovery of said code.

The use of a modulation of the variations has the advantage that the presence of the variations of the second physical parameter can be detected more reliably.

A further embodiment of the information system is characterized in that the information recorded is of a type which is recoverable by means of a predetermined data processing, the code represented by the modulation pattern of the second variations indicating the type of data processing to be used for recovering the information, the apparatus being provided with means for setting the recovery means in a mode in which the predetermined data processing indicated by the code recovered is performed.

This embodiment has the advantage that for recovering the information read from the record carrier it is required that the code represented by the modulation pattern is available. So the information can only be recorded by a dedicated play back apparatus, which is able to recover the code. In the event that the information is encrypted or scrambled before it is recorded on the record carrier the code preferably indicate the encryption key or the scramble method respectively.

Although not limited to an information system in which optically readable record carriers are used, the system is in particular suitable for this type of information systems.

In an optical record carrier it is relatively simple to provide the track in which the information has been recorded with a track modulation which can be detected by the same radiation beam as used for reading the information.

An embodiment of the information system in which this is realized, is characterized by servo control means for controlling the scanning in order to control at least one scanning parameter to a predetermined value on the basis of a detection signal received from the radiation sensitive detector and which is affected by said second physical parameter, which servo control means having a predetermined frequency bandwidth, said variations of said second physical parameter causes variations in the detection signal which exhibit a frequency spectrum which is located outside the bandwidth of servo control means and outside the frequency spectrum of the signal variations caused by the variations of the first physical parameter.

The variations in the second physical parameter can be in the form of variations in the track position in a direction transverse to the track direction. These variations can be detected on the basis of the tracking error signal.

The variations in the second physical parameter can be in the form of variations in the position of the plane in which the optically readable marks are located. In that event the variations can be detected on the basis of the focus error signal.

The variations in the second physical parameter can also be in the form of a variations in the mean value of the optical readable marks and the intermediate areas located between the optically readable marks. In that event the variations in the second physical parameter can be detected on the basis of variations in the data clock signal recovered during the scanning of the track with a constant linear velocity.

In the event that the record carrier used in the information system is a Compact Disc it is preferred to use an information system which is characterized in that the variations in the second physical parameter result in variations in the detection signal with a frequency substantially corresponding to 22 kHz in the event that the track is scanned with a scanning speed between 1.2 to 1.4 meter per second.

This embodiment has the advantage that it is impossible to copy the special disc on an usual recordable Compact Disc which is provided with a pregroove which exhibits a wobble which results in a tracking error with a frequency of substantial 22 kHz when the pregroove is scanned with a velocity between 1.2 and 1.4 meter per second. Even in the event that it succeeds to record a wobbling pattern of recording marks which corresponds to the wobbling recording marks of the record carrier to be copied, this pattern will not be detectable because of the presence of the wobbling pregroove which is situated in the same frequency range.

These and other aspects of the invention are described in more detail with reference to the drawing.

Figure 1B:
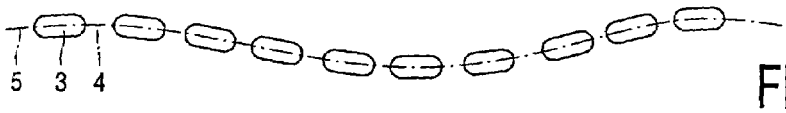
Figure 1C:
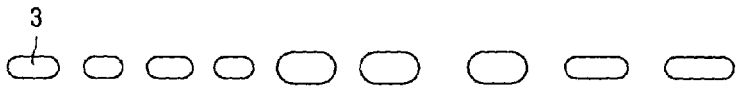
Figure 1D:
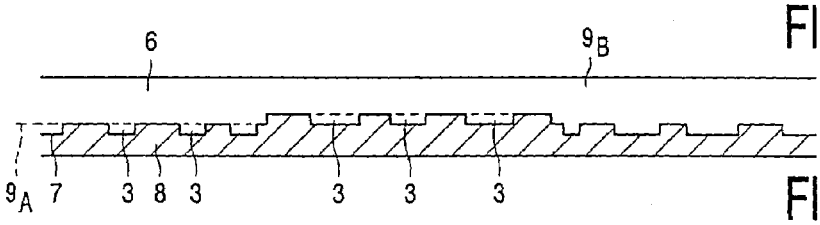
Figure 2:
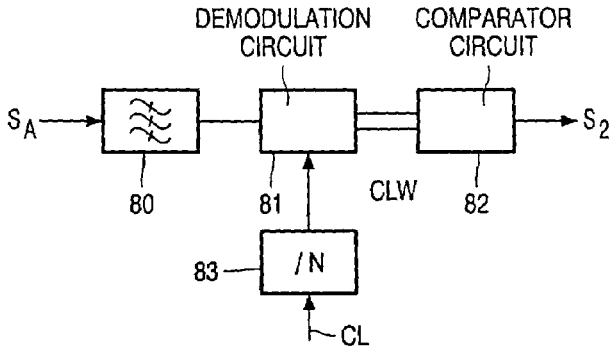
Figure 3:
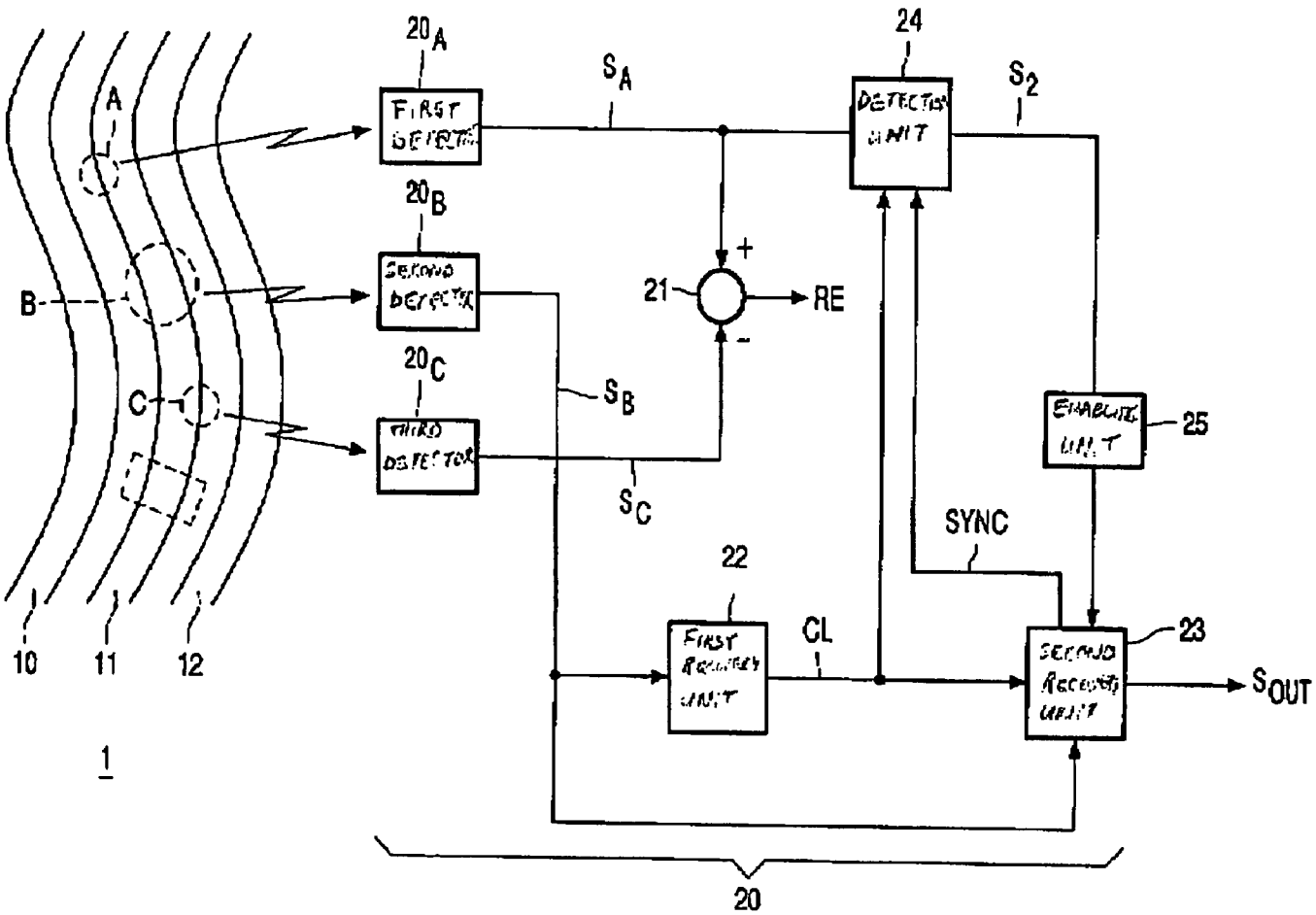
Figure 4:
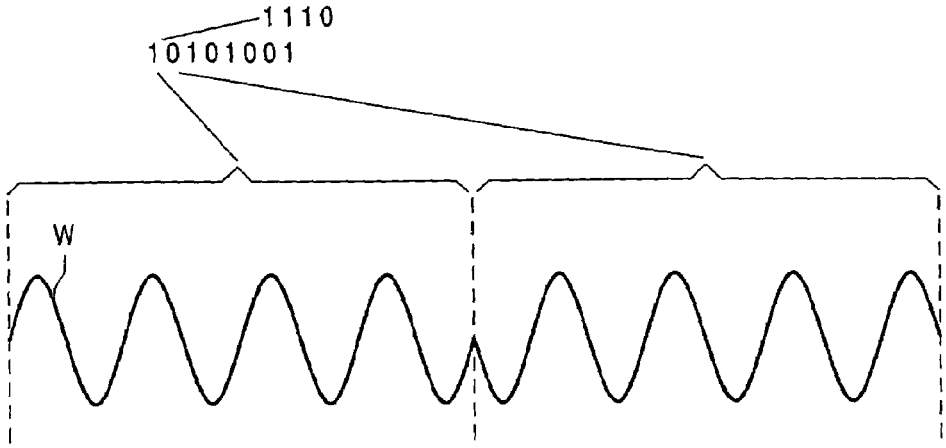
Figure 5:
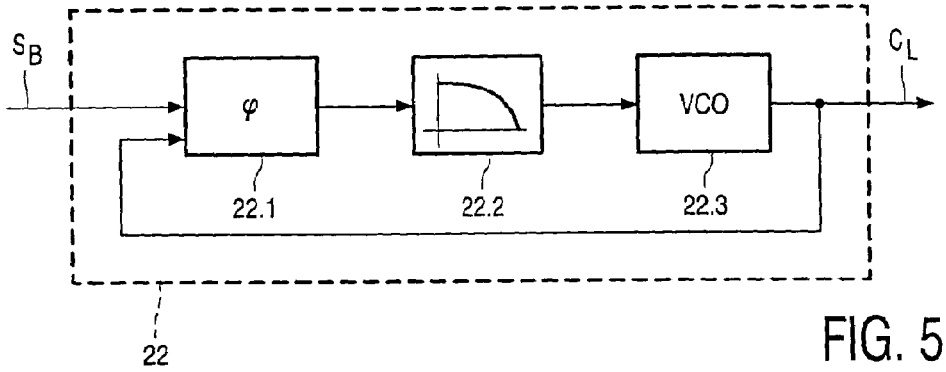
Figure 6:
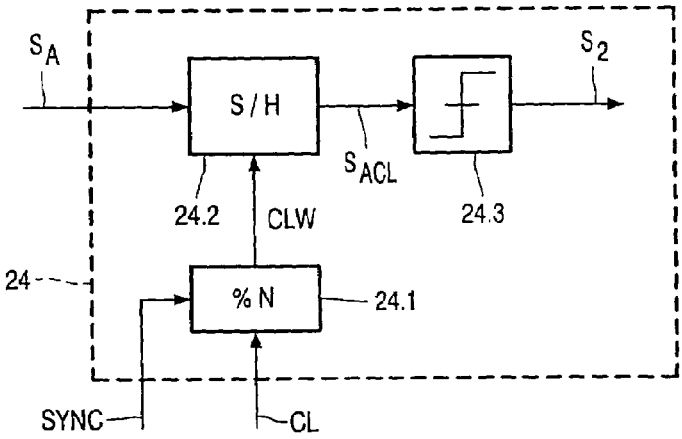

Therein FIGS. 1a, 1b, 1c, 1d and 2 show possible embodiments of a record carrier 1 for use in the information system in accordance with the invention, FIG. 3 schematically shows an information system according to the invention comprising a record carrier as well as a playback device 20 according to the invention, FIG. 4 schematically the representation of a code by the second variations, FIG. 5 shows a first unit of the playback apparatus of FIG. 3 in more detail, FIG. 6 shows a second unit of the playback apparatus of FIG. 3 in more detail, FIGS. 7A to 7F show a plurality of signals occuring in the playback apparatus shown in FIG. 3.

FIGS. 1a, 1b, 1c, 1d show possible embodiments of a record carrier 1 for use in the information system in accordance with the invention, FIG. 1a being a plan view, FIGS. 1b and 1c being highly enlarged plan views of a part 2 of a first and second embodiment of the record carrier 1, and FIG. 1d showing a small part of a sectional view of the part 2 along a line b-b of a third embodiment of the record carrier 1.

In the embodiment of the record carrier 1 shown in FIG. 1b the variations in first physical parameters have the form of optical detectable marks 3 which alternate with intermediate areas 4. The optically detectable marks may be in the form of so-called pits. However also other type of optically detectable marks are suitable. The optically detectable marks are arranged along a track of which the center line is indicated by a reference sign 5. In this embodiment the variations in the second physical parameter are variations of the track position in a direction transverse to the track direction. This position variation has the form of a track undulation, also known as a radial track wobble. Such track wobble can easily be detected by the same beam scanning unit as used for the detection of the optically detectable marks 3 as will be discussed in an other part of the description. The phase of the second variations is coupled to those of the first variations in that a predetermined number of wobbles corresponds to a predetermined number of channel bits represented by the first variations.

In the embodiment shown in FIG. 1c the variations of the second physical parameter have the form of variations of the width of the optical detectable marks 3. The variations in the width of marks 3 result in a additional intensity modulation in a radiation beam scanning the track. Both the variations in the width of the marks 3 and the information can be recovered on the basis of the intensity modulation, provided that the frequency spectrum of the component caused by the pattern of marks does not overlap the frequency spectrum of the component caused by the mark width variations. The phase of the second variations is coupled to those of the first variations in that a predetermined number of width variations corresponds to a predetermined number of channel bits represented by the first variations.

In FIG. 1d the reference sign 6 indicates a transparent substrate. The substrate 6 is covered with a reflective layer 7. The reflective layer 7 is covered by a protective layer 8. The substrate 6 is provided with optically detectable marks 3 in the form of pits. The variations in the second physical parameter are in the form of the variations of the position of the plane in which optically detectable marks 3 are situated. In FIG. 1d different positions of these planes are indicated by lines $\mathbf{9}_A$ and $\mathbf{9}_B$. When scanning the pattern as shown in FIG. 1d with a focused radiation beam the variations in the plane of the marks 3 result in a focus error which can be detected easily. The phase of the second variations is coupled to those of the first variations in that a predetermined number of variations of the position of the plane corresponds to a predetermined number of channel bits represented by the first variations.

FIG. 3 systematically shows a record carrier 1 according to the invention described with reference to FIG. 1A., as well as playback device 20 according to the invention. The track 11 shown exhibits first variations caused by existence and non-existence of information marks along the track. The first variations represent an information signal recorded onto said record carrier. The information signal can be a run-length sequence of bits. In particular the information signal is encoded according to the EFM-code. The track also exhibits second variations caused by variations associative with the information marks. In the embodiment shown the second variations are in the form of a radial wobble of the track as described with reference to FIG. 1A. The phase of the second variations is coupled to those of the first variations. In the embodiment shown the phase of the second variations is coupled to those of the first variations in that each EFM-frame corresponds to three periods of the wobble in the track, and starts at a zero crossing of the radial wobble.

In the embodiment shown the second variations have either a first or a second phase with respect to the first variations. As is illustrated in FIG. 4, the radial wobble W represents a binary code. The binary code, e.g. 1110 is biphase modulated. For example each '1' is converted in a '10' and each '0' in a '01'. The binary code 1110 is converted into the binary sequence 10101001 in that case. The so obtained binary sequence is converted in a radial wobble W in that the radial position of the marks is variated with a fixed frequency, but with either a first or a second phase, with respect to the first variations. At each polarity change of the binary sequence obtained by conversion the phase of the second variations is toggled between the first and the second phase. The first and the second phase differ with 180 degrees. This has the advantage that the signal $S_A$ representing the second variations can be sampled with a frequency twice the frequency of the second variations, such that each sample is a maximum regardless whether the phase equals the first or the second phase.

In the present embodiment the first and second phase are selected such that a zero crossing of the second variations coincides with the start of an EFM-frame. This has the advantage of that the EFM-frame sync can be used easily also for synchronizing the clock which is used for detecting the second variations. However any predefined phase relationship between the first and second variations could be used, provided that it is either standardized, or that the phase relationship is recorded at the record carrier. The playback device 20 shown in FIG. 3 comprises a transducer unit for scanning the record carrier 1, with tracks 10, 11, 12. The transducer unit is adapted to detect the first variations and the second variations. In the embodiment shown the transducer unit comprises an optical unit and a first, a second, and a third detector $\mathbf{28}_A$, $\mathbf{20}_B$, $\mathbf{20}_C$. The optical unit projects a central spot B and two satellite spots A, C at the record carrier. As the three beam method as such as well known, the optical unit is not shown. The radiation reflected from said spots A, B, C is detected by the first $\mathbf{20}_A$, the second $\mathbf{20}_B$, and the third $\mathbf{20}_C$. The playback apparatus further comprises a first 22 and a second recovery unit 23 coupled to the transducer unit. The first 22 and the second recovery unit 23 respectively recover a clock signal CL and information signal $S_{out}$ from the first variations. The playback apparatus 20 further comprises a detection unit 24 for detecting whether said second variations exhibit a predetermined variation pattern on the basis of the least one signal $S_A$, which is at least indicative of said second variations, which originates from said transducer unit. The playback apparatus further comprise an enabling unit 25 enabling the second recovery unit 24 to recover the information signal $S_{out}$ when said detection units 24 detects said predetermined variation pattern. The playback apparatus further comprise an enabling unit 25 for enabling the second recovery unit 24 to recover the information signal $S_{out}$ when said detection unit 24 detects said predetermined variation pattern.

The detection unit 24 uses the said clock signal CL generated by the first recovering unit 22 for detecting.

FIG. 5 shows an example of the first recovery unit 22 in more detail. The first recovery unit 22 comprise a phase detector 22.1 for detecting a phase difference between the signal SB received from the second detector 20B and the clock signal CL generated by the first recovery unit 22. An output signal of the phase detector 22.1 is passed via a loopfilter 22.2 to a controllable oscillator 22.3, e.g. a voltage controlled oscillator. An output of the controllable oscillator constitutes the clocksignal CL generated by the first recovery unit. FIG. 6 shows the detection unit 24 in more detail. The detection unit 24 comprise a first frequency divider 24.1 for generating a first auxiliary clock signal CL1 out of the clock signal CL. The first auxiliary clocksignal CL1 has a frequency which is a factor N lower than the frequency of the clock signal CL. In the present case, where the duration of an EFM-frame corresponds to three wobble cycles the value of N equals 98. In the embodiment shown the frequency divider 24.1 has a further input for receiving the signal SYNC, which indicates the start of each EFM-frame. The output signal CLW of the frequency divider 24.1 has a phase which is coupled to the phase of the clock signal CL derived from the first variations. A sample and hold unit 24.2 samples the signal $S_A$ at each positive transition of the clock signal CLW and generates the signal $S_{ACL}$ in response. The signal $S_{ACL}$ is provided to a threshold unit 24.3, which generates a binary signal $S_2$.

FIG. 2 shows an example of a detection unit that can be used in the event that a modulated radial wobble is used. This detection unit comprises a band pass filter 80 tuned to the frequency of the radial wobble. The input of the filter 80 is coupled to the detector 20A so as to receive the signal $S_A$. The output of the filter 80 is supplied to a demodulation circuit 81 for recovering the code represented by the modulated wobble, by using the clock signal CLW which is obtained by dividing the EFM clock signal CL with frequency divider 83. The code recovered by the demodulation circuit 81 is supplied to a comparator circuit 82 for comparing the code recovered with a predetermined code. The comparator circuit 82 is of a type that generates an enabling signal for the recovery circuit in the event that the code recovered by the demodulation circuit 81 corresponds with the predetermined code.

Figures 7A, 7B, 7C, 7D, 7E, 7F:
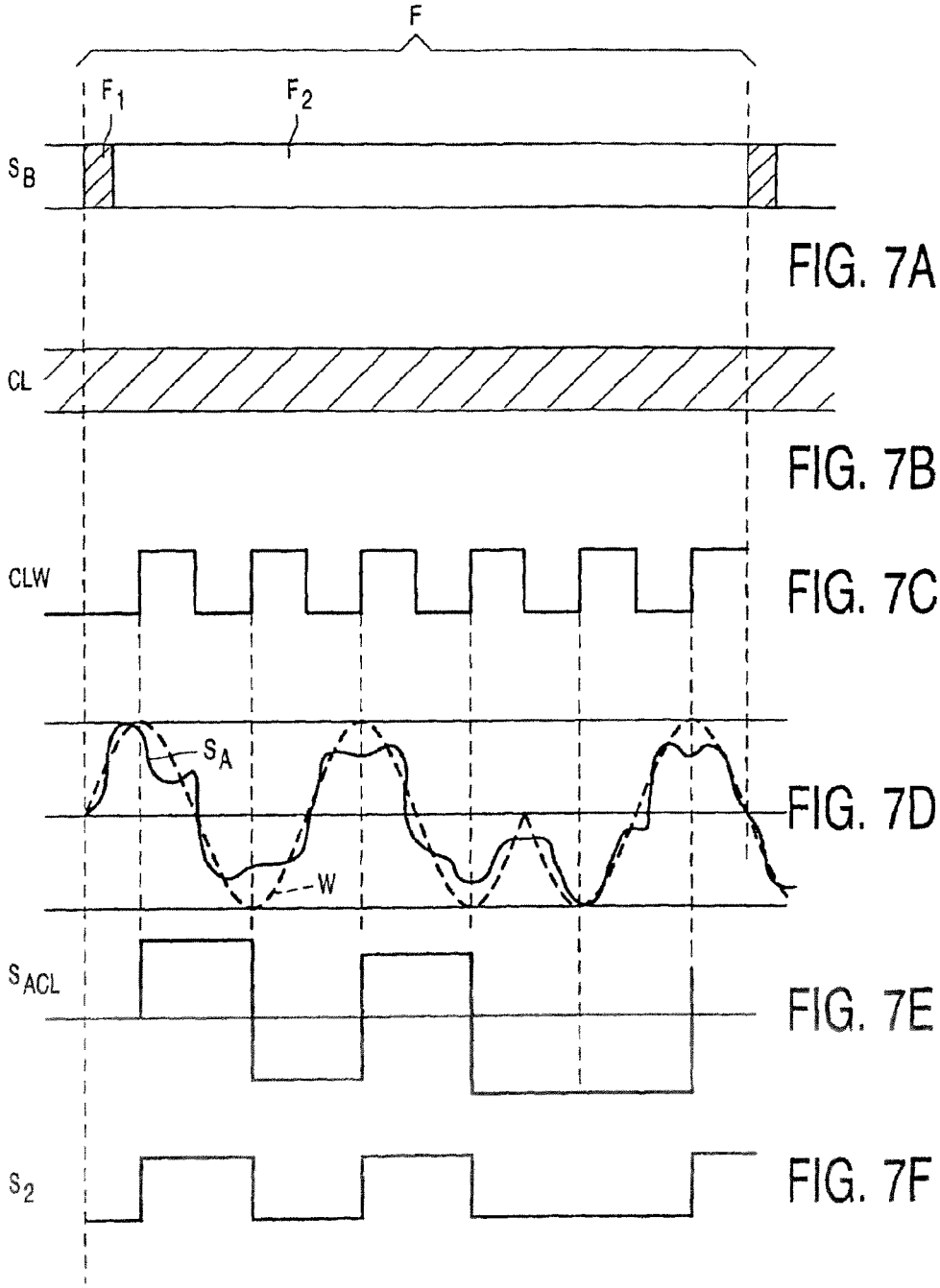

The operation of the apparatus according to the invention is now further described with reference to FIG. 7. FIG. 7A schematically shows the signal $S_B$, which comprises the EFM coded information. The signal $S_B$ comprises a sequence of frames F comprising a sync pattern $F_1$ of 24 channel bits and a data-portion $F_2$ of 564 channel bits. The clock signal CL (also schematically shown in FIG. 7B) deduced therefrom has a frequency of 4.3218 MHz. The clock signal CLW (FIG. 7C), generated by the frequency divider 24.1 has a frequency of 44.1 kHz. This clock signal CLW is coupled in phase to the signal $S_A$, as the second variations, in this case the radial wobble W (FIG. 7D) of the information marks is coupled in phase to the phase of the first variations, i.e. the information marks. In this case a positive transition of the clock signal CLW coincides with a maximum deviation of the wobble W. FIG. 7D also shows the signal $S_A$ which is representative of the second variations W. As shown therein the signal SA has a relatively large noise component. However, as the signal SA can be reliably sampled at those points in time where the wobble W has a maximum deviation, the polarity of the wobble W at those points can be reliably determined as illustrated in FIGS. 7E and 7F. FIG. 7E shows the signal $S_{ACL}$ provided by the sample and hold unit 24.2 and FIG. 7F shows the signal $S_2$ provided by the threshold unit 24.3.

It is noted that the signal processing operations of the player could be executed by dedicated hardware as well as by a general purpose processor which is suitably programmed.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features

The invention claimed is:

1. An information system, comprising: a record carrier (1) having information marks along a track (11) thereof and exhibiting:

first variations caused by existence and nonexistence of the information marks along the track, said first variations representing an information signal recorded on said record carrier, and second variations (W) caused by variations associated with the information marks; the phase of the second variations being coupled to the phase of the first variations, a playback apparatus (20) including:

a transducer unit [(20A, 20B, 20C)] ($20_A$, $20_B$, $20_C$) for scanning said record carrier (1), said [10] transducer unit being adapted to detect said first variations and said second variations, a first recovery unit (22) coupled to the transducer unit [(20A, 20B, 20C)] ($20_A$, $20_B$, $20_C$) for recovering a clock signal (CL) from the first variations, a second recovery unit (23) coupled to the transducer unit [(20A, 20B, 20C)] ($20_A$, $20_B$, $20_C$) for recovering an information signal ($S_{out}$) from the first variations, a detection unit (24) [fur] *for* detecting whether said second variations exhibit a predetermined variation pattern on the basis of at least one signal ($S_A$), which is at least indicative of said second variations, originating from said transducer unit, the detection unit (24) using the said clock signal (CL) for detecting, and an enabling unit (25) for enabling said second recovery unit (23) to recover the information signal [(Sout)] ($S_{out}$) when said detection unit (24) detects said predetermined variation pattern.

2. The system as claimed in claim 1, wherein said second variations exhibit a modulation pattern representing a code; and said detection unit includes a demodulation unit for recovering said code on the basis of said at least one signal, and an activation unit for activating said enabling unit when said code is recovered.

3. The system as claimed in claim 2, wherein the information signal recorded on said [reword] *record* carrier is [of a type which is] recoverable by means of a predetermined type of data processing, said code indicating the predetermined type of data processing to he used for recovering the information signal, and said playback apparatus further includes a unit for setting said recovery unit in a mode in which the predetermined type of data processing is performed when the information signal is recovered.

4. A record carrier (1) having information marks along a track (11) thereof and exhibiting:

first variations caused by existence and nonexistence of the information marks along the track, said first variations representing an information signal recorded on said record carrier, and second variations (W) caused by variations associated with the information marks; the phase of the second variations being coupled to the phase of the first variations.

5. A record carder according to claim 4, characterized in that the second variations have either a first or a second phase with respect to the first variations.

6. A record carrier according to claim 5, characterized in that first and the second phase differ [with] *by* 180 degrees.

7. A record carrier according to claim 4, characterized in that a predetermined variation pattern in die second variations allows sampling of said second variations at twice the frequency of said second variations.

8. A record carrier according to claim 4, characterized in that said second variation have a first and a second phase such that a predetermined relationship between said first and said second phase coincides to a start of frame.

9. A record carrier according to claim 8, characterized in that said predetermined relationship is a zero crossing.

10. A playback apparatus (20) including:

a transducer unit (20$_A$, 20$_B$, 20$_C$) for scanning a record carrier (1), said transducer unit being adapted to detect at least first and second variations, said first variations representing an information signal recorded on said record carrier, and second variations (W) caused by variations associated with the information marks; the phase of the second variations being coupled to the phase of the first variations, a first recovery unit (22) coupled to the transducer unit [(20A, 20B, 20C)] ($20_A$, $20_B$, $20_C$) for recovering a clock signal (CL) from the first variations, a second recovery unit (23) coupled to the transducer unit [(20A, 20B, 20C)] ($20_A$, $20_B$, $20_C$) for recovering an information signal ($S_{out}$) from the first variations, a detection unit (24) for detecting whether said second variations exhibit a predetermined variation pattern on the basis of at least one signal ($S_A$), which is at least indicative of said second variations, originating from said transducer unit, the detection unit (24) using the said clock signal (CL) for detecting and an enabling unit [(5)] (*25*) for enabling said second recovery unit (23) to recover the information signal [(Sout)] ($S_{out}$) when said detection unit detects (24) said predetermined variation pattern.

11. A playback apparatus according to claim 10, characterized in that said predetermined variation pattern allows sampling of said second variations at twice the frequency of said second variations.

12. A playback apparatus according to claim 10, characterized in that said second variation have a first and a second phase such that a predetermined relationship between said first and said second phase coincides to a start of frame.

13. A playback apparatus according to claim 12, characterized in that said predetermined relationship is a zero crossing.

14. A system as claimed in claim 1, characterized in that a predetermined variation pattern within said second variation allows sampling of said second variations at twice the frequency of said second variations.

15. A system as claimed in claim 1, characterized in that said second variations have a first and a second phase such that a predetermined relationship between said first and said second phase coincides to a start of frame.

16. A system as claimed in claim 15, characterized in that predetermined relationship is a zero crossing.

*17. An information system, comprising:*

*a record carrier (1) having information marks along a track (11) thereof and exhibiting: first variations caused by existence and nonexistence of the information marks along the track, said first variations representing an information signal on said record carrier, and second variations (W) caused by variations associated with the information marks; the phase of the second variations being coupled to the phase of the first variations,*

*a playback apparatus (20) including:*

*a transducer unit ($20_A$, $20_B$, $20_C$) for scanning said record carrier (1), said transducer unit being adapted to detect said first variations and said second variations and to generate at least one signal ($S_A$), which is indicative of said second variations,*

*a first recovery unit (22) coupled to the transducer unit ($20_A$, $20_B$, $20_C$) for recovering a clock signal (CL) from the first variations,*

*a second recovery unit (23) coupled to the transducer unit ($20_A$, $20_B$, $20_C$) for recovering an information signal ($S_{out}$) from the first variations,*

*a detection unit (24) for detecting whether said second variations exhibit a predetermined variation pattern on the basis of said at least one signal ($S_A$) and said clock signal (CL) and*

*an enabling unit (25) for enabling said second recovery unit (23) to recover the information signal ($S_{out}$) when said detection unit detects (24) said predetermined variation pattern.*

*18. The system as claimed in claim 17, wherein said second variations exhibit a modulation pattern representing a code; and said detection unit includes a demodulation unit for recovering said code on the basis of said at least one signal ($S_A$), and an activation unit for activating said enabling unit when said code is recovered.*

*19. The system as claimed in claim 18, wherein the information signal recorded on said record carrier is recoverable by means of a predetermined type of data processing, said code indicating the predetermined type of data processing to be used for recovering the information signal, and said playback apparatus further includes a unit for setting said second recovery unit in a mode in which the predetermined type of data processing is performed when the information signal is recovered.*

*20. A record carrier (1) having information marks along a track (11) thereof and exhibiting:*

*first variations caused by existence and nonexistence of the information marks along the track, said first variations representing an information signal on said record carrier, and*

*second variations (W) caused by variations associated with the information marks; the phase of the second variations being coupled to the phase of the first variations.*

*21. A record carrier according to claim 20, characterized in that the second variations have either a first predetermined phase or a second predetermined phase with respect to the phase of the first variations.*

*22. A record carrier according to claim 21, characterized in that first and the second predetermined phase differ by 180 degrees.*

*23. A record carrier according to claim 20, characterized in that the second variations are variations of the track position in a direction transverse to the track direction, thereby exhibiting track wobbles.*

*24. A record carrier according to claim 23, characterized in that the phase of the second variations is coupled to those of the first variations in that a predetermined number of wobbles corresponds to a predetermined number of channel bits represented by the first variations.*

*25. A record carrier according to claim 20, characterized in that the information signal has frames having frame syncs.*

*26. A record carrier according to claim 25, characterized in that a zero crossing of the second variations has a predefined phase relationship with the frame syncs.*

*27. A record carrier according to claim 20, characterized in that the information is scrambled and the second variations exhibit a modulation pattern representing a code, indicative of the scramble method.*

*28. A record carrier according to claim 20, characterized in that the information is encrypted and the second variations exhibit a modulation pattern representing a code, indicative of the encryption key.*

*29. A record carrier according to claim 20, which is optically readable.*

*30. A record carrier according to claim 20, wherein the information marks are optically detectable marks in the form of pits.*

*31. A playback apparatus (20) including:*

*a transducer unit ($20_A$, $20_B$, $20_C$) for scanning a record carrier (1), said transducer unit being adapted to detect first variations representing an information signal on said record carrier and second variations and to generate at least one signal ($S_A$), which is indicative of said second variations,*

*a first recovery unit (22) coupled to the transducer unit ($20_A$, $20_B$, $20_C$) for recovering a clock signal (CL) from the first variations,*

*a second recovery unit (23) coupled to the transducer unit ($20_A$, $20_B$, $20_C$) for recovering an information signal ($S_{out}$) from the first variations,*

*a detection unit (24) for detecting whether said second variations exhibit a predetermined variation pattern on the basis of said at least one signal ($S_A$) and said clock signal (CL) and*

*an enabling unit (25) for enabling said second recovery unit (23) to recover the information signal ($S_{out}$) when said detection unit detects (24) said predetermined variation pattern.*

*32. The apparatus as claimed in claim 31, wherein said detection unit includes a demodulation unit for recovering a code from a modulation pattern of said second variations on the basis of said at least one signal ($S_A$), and an activation unit for activating said enabling unit when said code is recovered.*

*33. The apparatus as claimed in claim 32, wherein the information signal recorded on said record carrier is recoverable by means of a predetermined type of data processing, said code indicating the predetermined type of data processing to be used for recovering the information signal, and said playback apparatus further includes a unit for setting said second recovery unit in a mode in which the predetermined type of data processing is performed when the information signal is recovered.*

*34. A playback apparatus according to claim 31, characterized in that, while in the record carrier the information is encrypted and the second variations exhibit a modulation pattern representing a code indicative of the encryption key, the playback apparatus is adapted for decrypting the information using said code.*

*35. A playback apparatus according to claim 31, characterized in that, while in the record carrier the information is*

*scrambled and the second variations exhibit a modulation pattern representing a code indicative of the scramble method, the playback apparatus is adapted for descrambling the information using said code.*

*36. A playback apparatus according to claim 31, characterized in that the transducer unit is adapted for detecting wobbles as said second variations, said wobbles being variations of the track position in a direction transverse to the track direction.*

*37. A playback apparatus according to claim 36, characterized in that the playback apparatus comprises a frequency divider for generating an auxiliary clock signal (CLW) out of the clock signal (CL) in accordance with the phase of the second variations being coupled to the phase of the first variations by a predetermined number of wobbles corresponding to a predetermined number of channel bits represented by the first variations, which auxiliary clock signal is for detecting the second variations.*

*38. A playback apparatus according to claim 37, characterized in that the frequency divider has an input for receiving a signal (SYNC) which indicates the start of a frame.*

*39. A playback apparatus according to claim 38, in which the signal (SYNC) is used for re-synchronizing the auxiliary clock signal.*

*40. An information system, comprising:*

*a record carrier having information marks along a track thereof and exhibiting: first variations resulting from information marks along the track, said first variations representing an information signal, and second variations resulting from variations associated with the information marks that are substantially independent of the information signal; the phase of the second variations being coupled to the phase of the first variations,*

*a playback apparatus including:*

*a transducer unit for scanning said record carrier, said transducer unit having a detector for detecting said first variations and said second variations,*

*a first recovery unit communicating with the transducer unit for recovering a clock signal from the first variations,*

*a second recovery unit communicating with the transducer unit for recovering the information signal from the first variations,*

*a detection unit for detecting whether said second variations include a predetermined variation pattern, the detecting depending on said clock signal, and*

*an enabling unit for controlling when said second recovery unit recovers the information signal depending on when said detection unit detects said predetermined variation pattern.*

*41. A playback apparatus including:*

*a transducer unit for scanning a record carrier, said transducer unit having a detector for detecting first variations encoding an information signal and second variations substantially independent of the information signal,*

*a first recovery unit communicating with the transducer unit for recovering a clock signal from the first variations,*

*a second recovery unit communicating with the transducer unit for recovering the information signal from the first variations,*

*a detection unit for detecting whether said second variations include a predetermined variation pattern, the detecting depending on said clock signal, and*

*an enabling unit for controlling when said second recovery unit recovers the information signal depending on when said detection unit detects said predetermined variation pattern.*

* * * * *